United States Patent
Yde-Andersen et al.

(10) Patent No.: US 6,346,351 B1
(45) Date of Patent: Feb. 12, 2002

(54) LITHIUM SALT/CARBONATE ELECTROLYTE SYSTEM, A METHOD FOR THE PREPARATION THEREOF, THE USE THEREOF AND A BATTERY CONTAINING THE ELECTROLYTE SYSTEM

(75) Inventors: Steen Yde-Andersen, Odense; Ningling Rao, Arslev, both of (DK)

(73) Assignee: Danionics A/S, Odense (DK)

( * ) Notice: Subject to any disclaimer, the term of this patent is extended or adjusted under 35 U.S.C. 154(b) by 0 days.

(21) Appl. No.: 09/269,648

(22) PCT Filed: Sep. 30, 1997

(86) PCT No.: PCT/DK97/00415

§ 371 Date: Jun. 14, 1999

§ 102(e) Date: Jun. 14, 1999

(87) PCT Pub. No.: WO98/15025

PCT Pub. Date: Apr. 9, 1998

(30) Foreign Application Priority Data

Sep. 30, 1996 (DK) .............................................. 1074/96

(51) Int. Cl.$^7$ ................................................. H01M 6/14
(52) U.S. Cl. ........................ 429/330; 429/331; 429/326
(58) Field of Search ................................ 429/324, 326, 429/327, 331, 338, 322, 323, 330, 329, 332

(56) References Cited

U.S. PATENT DOCUMENTS

| | | | |
|---|---|---|---|
| 5,079,109 A | 1/1992 | Takami et al. | 429/197 |
| 5,192,629 A | 3/1993 | Guyomard et al. | 429/197 |
| 5,296,318 A | 3/1994 | Gozdz et al. | 429/192 |
| 5,370,949 A | 12/1994 | Davidson et al. | 429/224 |
| 5,422,203 A | 6/1995 | Guyomard et al. | 429/194 |
| 5,429,891 A | 7/1995 | Gozdz et al. | 429/192 |
| 5,472,809 A | * 12/1995 | Perton | 429/331 |

FOREIGN PATENT DOCUMENTS

| | | | | |
|---|---|---|---|---|
| JP | 11086907 | * | 3/1999 | H01M/10/40 |
| WO | WO 95/34920 | | 12/1995 | H01M/10/40 |
| WO | WO 96/18215 | | 6/1996 | H01M/6/16 |

OTHER PUBLICATIONS

Pistoia, G. et al., Electrochimica Acta, vol. 41, No. 17, pp. 2683–2689, 1996.

* cited by examiner

Primary Examiner—Gabrielle Brouillette
Assistant Examiner—Mark Ruthkosky
(74) Attorney, Agent, or Firm—Darby & Darby

(57) ABSTRACT

The instant invention is to an electrolyte consisting essentially of a salt mixture and a solvent mixture. The solvent mixture consists essentially of ethylene carbonate and dimethyl carbonate and the salt mixture consists of 60–90% lithium tetrafluoroborate and 10–40% lithium hexafluorophosphate. A battery comprising this electrolyte and a method of preparing this electrolyte are exhibited.

22 Claims, No Drawings

LITHIUM SALT/CARBONATE ELECTROLYTE SYSTEM, A METHOD FOR THE PREPARATION THEREOF, THE USE THEREOF AND A BATTERY CONTAINING THE ELECTROLYTE SYSTEM

This application is a 371 of PCT/DK97/00415, filed Sep. 30, 1997.

This invention relates to an electrolyte system, a method for the preparation thereof, the use thereof, and a battery containing the electrolyte system, and particularly to an electrolyte composition and a rechargeable battery of high compatiblity towards positive electrode structures, high cyclability and low irreversible loss.

The use of non-aqueous electrolytes has allowed the development of electrochemical systems based on lithium-containing negative electrode structures and positive intercalation metal oxides, which have high energy density. For those systems, however, the limiting factor for their continuous performance has been their low electrolyte electrochemical stability, leading to poor cell cyclability.

Said cyclability is defined as the number of times a battery can be charged and discharged between 4.2V and 3.0V at a current density of 1 mA/cm$^2$ before the capacity is reduced to 80% of the discharge capacity of the first discharge of the battery.

Upon operation of such electrochemical cells, a capacity loss during initial charging of the cells is observed, as is a fading capacity upon extended cycling. Those capacity reduction phenomena can be ascribed to the instability of the electrolyte towards the negative and the positive electrode of the electrochemical cell. The instability towards the negative electrode leads to gassing and formation of a passivating film. The instability towards the positive electrode leads to corrosion of the electrode structure. Both phenomena result in loss of active material from the cell. Further, passivation and corrosion may lead to increased cell impedance, and reduced materials utilisation and rate capability.

The gassing and the formation of the passivating film is believed to take place during the initial charging, subsidiary during the young life of the electrochemical cell. Therefore, the capacity loss during the initial charging is mainly ascribed to the instability of the electrolyte-negative electrode structure-system. The corrosion is an ongoing process, which is believed mainly to take place towards the end of each charging cycle at maximum potential of the positive electrode structure. Therefore, the capacity loss during cycling is mainly ascribed to the instability of the electrolyte-positive electrode structure-system, i.e. lack of compatibility of the electrolyte towards the positive electrode structure.

The capacity loss during the first charging of the battery is referred to as the initial irreversible loss, and is defined as the loss of active lithium in mAh of charge vs. the weight of the negative electrode structure in grains. In this context the loss is defined as active material which reacts irreversibly with the negative electrode structure, and which cannot be deintercalated from the structure during the subsequent discharge of the battery.

The known electrolyte or electrolyte systems are mainly composed of one or more salts in a solvent or solvent mixture. Traditionally, a number of salts are commonly applied in non-aqueous electrolyte systems, including lithium perchlorate, lithium hexafluorarsenate, lithium trifluoromethylsulfonate, lithium tetrafluoroborate, lithium hexafluorophosphate, lithium bromide, lithium hexafluoroantimonate, $LiC(CF_3SO_2)_3$ and $LiN(CF_3SO_2)_2$.

The solvents used are e.g. ethylene carbonate, propylene carbonate, dimethyl carbonate, diethyl carbonate, γ-butyrolactone, γ-valerolactone, tetrahydrofuran, 2-methyl tetrahydrofuran, dimethoxyethane, diethoxyethane, methyl acetate, methyl formate, 1.3-dioxolane, sulfolane, acetonitrile and butyronitrile.

A large number of electrolyte systems have been composed from these salts and solvents in order to improve inter alia the electrochemical stability of the systems.

It has now been found that the cyclability and stability of an electrochemical system such as a battery may be improved considerably, by using a electrolyte system having the composition of claim 1.

By using salt mixtures of lithium tetrafluoroborate and lithium hexafluorophosphate, excessive in the borate, in batteries it has been observed, that high cyclability (low capacity loss during extended discharge-recharge) and a low initial irreversible loss can be obtained.

This excellent performance has been found for those salts compositions containing 60–90% by mole of lithium tetrafluoroborate and 10–40% by mole of lithium hexafluorophosphate. These salt compositions are believed to be dominated by a high compatibility of the borate against the positive electrode structure, supported by negative structure compatibility and contribution to the conductivity from the phosphate.

It has further been found that the performance is especially pronounced for the high stability solvent mixture of ethylene carbonate and dimethyl carbonate and particularly if these solvents are the only liquid solvents present. Further, the performance of the electrolyte system is especially pronounced, when combined with negative electrode structures of carbonaceous intercalation materials like coke and graphite and/or positive electrode structures of lithium manganese oxide spinels.

A number of patents describe the use of the lithium tetrafluoroborate/lithium hexafluorophosphate salts in a solvent mixture consisting of or comprising ethylene carbonate and dimethyl carbonate.

U.S. Pat. No. 5,192,629 and U.S. Pat. No. 5,422,203 of Bell Communication Research describe the use of an electrolyte system with a mixture of ethylene carbonate (EC) and dimethyl carbonate (DMC) as solvent and lithium hexafluorophosphate and mixtures of lithium hexafluorophosphate with up to about equal mole parts of lithium tetrafluoroborate as solute. The teaching in these patents is that this group of electrolytes provides an improved resistance against oxidation. The only example showing the effect of the electrolyte, is composed from 1M $LiPF_6$ in 95 DMC:5 EC. Though it is mentioned that the electrolyte may comprise lithium tetrafluoroborate, nothing is mentioned about the effect of lithium tetrafluoroborate.

U.S. Pat. No. 5,079,109 of Toshiba Battery Co., Ltd. describes an electrolytic salt consisting of one of lithium phosphate hexafluoride ($LiPF_6$) and lithium borofluoride ($LiBF_4$) in a solvent mixture consisting of ethylene carbonate, 2-methyltetrahydrofuran and at least one ester-based nonaqueous solvent selected from butylene carbonate, dimethyl carbonate, γ-butyrolactone and sulfolane. In none of the numerous examples of this patent, however, the mixture of said electrolytic salts and the positive effect thereof are described.

U.S. Pat. No. 5,296,318 and U.S. Pat. No. 5,429,891 of Bell Communication Research, Inc. describe a solid electrolyte for a rechargeable lithium intercalation battery cell of a self-supporting film of a copolymer of vinylidene fluoride and hexafluoropropylene, the electrolyte thereof being selected from LiPF$_6$, LiAsF$_6$, LiClO$_4$, LiN(CF$_3$SO$_2$)$_2$, LiBF$_4$, LiCF$_3$SO$_3$ and LiSbF$_6$ and the solvent thereof being selected from ethylene carbonate, propylene carbonate, dimethyl carbonate, diethoxyethane, diethyl carbonate, dimethoxyethane, dipropyl carbonate and mixtures thereof. The patent, however, describes no mixtures of said electrolytic salts and their performance.

G. Pistoia, A. Antonini, R. Rosati and D. Zane (Electrochemica Acta 41 2683-9 (1996)) describe cathodes for Li-ion batteries based on electrolyte compositions of either LiPF$_6$ or LiBF$_4$ in a mixture of ethylene carbonate and dimethyl carbonate. The authors do not describe, however, the salt mixtures of the present invention.

U.S. Pat. No. 5,370,949 of National Research Council of Canada describes a non-aqueous electrolyte of which the salt is selected from LiAsF$_6$, LiPF$_6$, LiBF$_4$, LiClO$_4$, LiBr, LiAlCl$_4$, LiCF$_3$SO$_3$. KLiC(CF$_3$SO$_2$)$_3$ and LiN(CF$_3$SO$_2$)$_2$ and mixtures thereof a solvent thereof being selected from ethylene carbonate, 2-methyl tetrahydrofuran, tetrahydrofuran, dimethoxyethane, diethoxyethane, dimethyl carbonate, diethyl carbonate, methyl acetate, methyl formate, γ-butyrolactone, 1,3-dioxolane, sulfolane, acetonitrile, butyronitrile, trimethylphosphite and dimethylformamide and mixtures thereof. The patent, however, does no describe the good performance of the specific mixture of lithium hexafluorophosphate and lithium tetrafluoroborate in a mixture of ethylene carbonate and dimethyl carbonate.

WO 95/34920 of Lexcel Technology Ltd. describes the use of electrolytes of LiBF$_4$ and/or LiPF$_6$ and/or lithium trifluoromethane sulphonamide in a mixture of a linear carbonate and a cyclic ester, where said linear carbonate may be e.g. Diethyl carbonate or dimethyl carbonate, and said cyclic ester may be e.g. polypropylene carbonate or ethylene carbonate. The patent, however, does no describe the mixture of lithium hexafluorophosphate and lithium tetrafluoroborate in a mixture of ethylene carbonate and dimethyl carbonate according to the present invention and its performance.

In a preferred embodiment of the present invention the solvent mixture comprises ethylene carbonate and dimethyl carbonate in a relative molar ratio of from 80:20 to 20:80, more preferably in a relative molar ratio of from 80:20 to 50:50, even more preferably in a relative molar ratio of from 75:25 to 60:40.

In an alternative embodiment of the invention the solvent mixture in addition to ethylene carbonate and dimethyl carbonate comprises one or more of the following solvents:

(a) other alicyclic carbonates represented by the following general formula:

—C(=O)—O—CR$_1$R$_2$—[CR$_3$R$_4$]$_m$—CR$_5$R$_6$—O—, wherein each of R$_1$, R$_2$, R$_3$, R$_4$, R$_5$ and R$_6$ independently represent hydrogen or C$_1$–C$_4$ alkyl groups and in is an integer equal to 1 or 5, preferably propylene carbonate;

(b) aliphatic carbonates represented by the general formula R$_7$[OC(O)]$_p$OR$_8$, wherein R$_7$ and R$_8$ independently represent C$_1$–C$_4$ alkyl groups, and p is an integer equal to 1 or 2, with the proviso that R$_8$ represent C$_2$–C$_4$ alkyl groups, when R$_7$ is methyl, and p=1, preferably diethyl carbonate;

(c) lactones in the form of cyclic esters represented by the general formula:

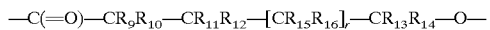

wherein each of R$_9$, R$_{10}$, R$_{11}$, R$_{12}$, R$_{13}$, R$_{14}$, R$_{15}$ and R$_{16}$ independently represent hydrogen or C$_{1-2}$ alkyl groups and r is an integer equal to 0 or 1, preferably γ-valerolactone or γ-butyrolactone;

(d) esters represented by the formula R$_{17}$[C(O)]OR$_{18}$ [OR$_{19}$]$_t$, wherein each of R$_{17}$, R$_{18}$ and R$_{19}$ independently represent hydrogen or C$_1$–C$_2$ alkyl groups, and t is an integer from 0 to 2, preferably an acetate, more preferably (2-methoxyethyl)-acetate and/or ethyl acetate;

(e) glymes represented by the general formula R$_{20}$O(R$_{21}$O)$_n$R$_{22}$, in which R$_{20}$ and R$_{22}$ independently represent C$_{1-2}$ alkyl groups, R$_{21}$ is —(CR$_{23}$R$_{24}$CR$_{25}$R$_{26}$)— wherein R$_{23}$, R$_{24}$, R$_{25}$ and R$_{26}$ independently each represent hydrogen or C$_1$–C$_4$ alkyl groups, and n is an integer from 2 to 6, preferably 3, R$_{20}$ and R$_{22}$ preferably being methyl groups, R$_{23}$, R$_{24}$, R$_{25}$ and R$_{26}$ preferably being hydrogen or C$_{1-2}$ alkyl groups, more preferably hydrogen.

In a preferred embodiment of the invention the mixture of salts comprises lithium tetrafluoroborate and lithium hexafluorophosphate in a relative molar ratio of from 85:15 to 70:30.

In a further preferred embodiment of the invention the lithium tetrafluoroborate and lithium hexafluorophosphate are present in a total concentration in the range from 0.0M to 3M, preferably 0.1M to 2M, more preferably 0.5M to 1.5M.

It is further preferred that the electrolyte system comprises a crosslinked or non-crosslinked, preferably non-crosslinked polymer, preferably a non-crosslinkable polyester, polyurethane, polyether, polyacrylate, polyvinylidene fluoride or polyolefin. Said polymer is more preferably selected from polymerised mono-, di- and trifunctional oligomeric acrylates, preferably polyurethane acrylates and polyether acrylates, or from polymerised mono-, di- and trifunctional monomeric acrylates, preferably monofunctional monomeric acrylates, more preferably urethane acrylate.

Said polymer may be present in an amount corresponding to from 0% to 50% by weight, preferably 2 to 25% by weight relative to the total weight of the electrolyte system.

In an embodiment of the invention the electrolyte system is confined in a separator consisting of a porous structure made from a polymer, preferably polyethylene, polypropylene, polycarbonate, cellulose, glass fiber or any inorganic material. Said separator is preferably of a woven or non-woven structure having a pore size in the range of 10×10 nm to 1×1 mm. Further, the separator has a thickness of 10–100 μm, preferably 10–25 μm.

The present invention relates also to a method for the preparation of an electrolyte system as defined above comprising the steps of mixing the solvents, dissolving the salts in the solvent mixture, optionally adding a thickening agent to the solution, optionally incorporating the mixture obtained in a separator, and optionally adding monomers or oligomers having one or more polymerisable functional groups and inducing polymerisation of these monomers or oligomers. Finally the electrolyte system may be sandwiched between electrode laminates of an electrochemical system like a battery, capacitor or electrochromic display.

The invention further relates to the use of the electrolyte system in a battery, which may be any lithium battery in which the negative electrode may consist essentially of graphites, cokes, or any other intercalation compound like oxides of tin, titanium, vanadium, cobalt or manganese, and in which the positive electrode structure may comprise an intercalation compound, preferably of the transitions metal oxide type, more preferably lithium manganese oxide, lithium cobalt oxide or vanadium oxides, even more preferably spinel lithium manganese oxide.

In a preferred embodiment of the invention the negative electrode in the battery consists essentially of graphites and cokes, which are able to intercalate lithium and which have an interlayer distance $d_{002}$ of no more than 3.48 Å.

The positive effect of the electrolyte compositions of the present invention are especially pronounced when combined with such negative electrode strictures of the graphite and coke type.

Surprisingly, the effect is mostly pronounced when the electrolyte compositions are combined with the graphite material having the trade name "SFG 15" from TIMCAL G+T (Lonza G+T, CH) or when they are combined with any coke material of an interlayer distance $d_{002}$ in the range 3.42–3.44 Å.

The positive electrode of the battery is preferably based on lithium manganese oxide spinel.

Alternatively, the electrolyte system may be used in a capacitor or in an electrochromic display.

EXAMPLES

The invention is further illustrated in the following examples.

In these examples the terms "cyclability" and "initial irreversible loss" have the meaning defined above, unless otherwise specified, Further, graphite refers to a synthetic graphite of an interlayer, distance $d_{002}$ of 3.36 and coke refers to a petroleum coke of an interlayer distance $d_{002}$ of 3.46 Å, unless otherwise specified.

Lithium tetrafluoroborate, lithium hexafluorophosphate, ethylene carbonate, dimethyl carbonate and propylene carbonate all refer to battery grade compounds from Merck, whereas lithium manganese oxide refers to a lithium manganese oxide spinel structure of chemical composition $LiMn_2O_4$.

Example 1

A battery was prepared with an electrolyte composition of 70.30 by mole of ethylene carbonate and dimethyl carbonate and a 75:25 by mole salt mixture of lithium tetrafluoroborate and hexafluorophosphate of a total salt concentration of 1M. The electrolyte was prepared by simple mixing. The battery was prepared by sandwiching said electrolyte system between a negative electrode structure of graphite and a positive electrode structure of lithium manganese oxide. Both of the active electrode materials were mixed with 5% of carbon black for improved electronic conductivity.

Upon cycling of the battery it displayed a cyclability of more than 350 cycles. In terms of irreversible loss during the initial charging, the cell displayed a loss of 50 mAh/g of anode material.

Comparative Example 1a

For comparison, a battery was prepared with an electrolyte compositions of 70:30 by mole of ethylene carbonate and dimethyl carbonate and a salt mixture of 25:75 by mole of lithium tetrafluoroborate and hexafluorophosphate of a total salt concentration of 1M. The electrolyte was prepared by simple mixing. The battery was assembled by sandwiching said electrolyte system between a negative electrode structure of graphite and a positive electrode structure of lithium manganese oxide.

Both of these active electrode materials were mixed with 5% of carbon black for improved electronic conductivity.

Upon cycling of the battery it displayed a cyclability of 150 cycles, displaying an initial irreversible loss of 80 mAh/g of the anode material.

Comparative Example 1b

For further comparison, another battery was prepared with an electrolyte compositions of 70:30 by mole of ethylene carbonate and dimethyl carbonate and pure lithium tetrafluoroborate as electrolyte salt in a concentration of 1M. The electrolyte was prepared by simple mixing. The battery was assembled by sandwiching said electrolyte system between a negative electrode structure of graphite and a positive electrode structure of lithium manganese oxide. Both of these active electrode materials were mixed with 5% of carbon black for improved electronic conductivity.

Upon cycling of the battery it displayed a cyclability of 300 cycles, however, displaying an initial irreversible loss of 100 mAh/g of the anode material.

Comparative Example 1c

For even further comparison, yet another battery was prepared applying an electrolyte compositions of 70:30 by mole of ethylene carbonate and dimethyl carbonate and pure lithium hexafluorophosphate as electrolyte salt at a concentration of 1M. The electrolyte was prepared by simple mixing. The battery was assembled by sandwiching said electrolyte system between a negative electrode structure of graphite and a positive electrode structure of lithium manganese oxide. Both of these active electrode materials were mixed with 5% of carbon black for improved electronic conductivity.

Upon cycling of the battery it displayed a cyclability of only 100 cycles, displaying an initial irreversible loss of 50 mAh/g of the anode material.

Comparative Example 1d

For further comparison, another battery was prepared applying an electrolyte compositions of 70:30 by mole of ethylene carbonate and propylene carbonate and a 75:25 by mole salt mixture of lithium tetrafluoroborate and hexafluorophosphate of a total salt concentration of 1M. The electrolyte was prepared by simple mixing. The battery was assembled by sandwiching said electrolyte system between a negative electrode stricture of graphite and a positive electrode structure of lithium manganese oxide. Both of these active electrode materials were mixed with 5% of carbon black for improved electronic conductivity.

Upon cycling of the battery it displayed a cyclability of only 5 cycles, however, displaying a high initial irreversible loss of more than 500 mAh/g of the anode material.

Example 2

A battery was prepared applying an electrolyte compositions of 80:20 by mole of ethylene carbonate and dimethyl carbonate and a salt mixture of 70:30 by mole of lithium tetrafluoroborate and hexafluorophosphate of a total salt concentration of 1M. The electrolyte was prepared by simple mixing. The battery was assembled by sandwiching said electrolyte system between a negative electrode structure of graphite SFG15 from TIMCAL and a positive electrode structure of lithium manganese oxide. Both of these active electrode materials were mixed with 5% of carbon black for improved electronic conductivity.

Upon cycling of the battery it displayed a cyclability of more than 350 cycles, displaying a high reversible capacity of 360 mAh/g of the anode and an initial irreversible loss of less than 50 mAh/g of the anode material.

Example 3

Another battery was prepared applying an electrolyte compositions of 80:20 by mole of ethylene carbonate and dimethyl carbonate and a salt mixture of 80:20 by mole of lithium tetrafluoroborate and hexafluorophosphate of a total salt concentration of 1M. The electrolyte was prepared by simple mixing. The battery was assembled by sandwiching said electrolyte system between a negative electrode structure of coke and a positive electrode structure of lithium manganese oxide. Both of these active electrode materials were mixed with 5% of carbon black for improved electronic conductivity.

Upon cycling of the battery it displayed a cyclability of more than 300 cycles (in this case the battery was cycled between 4.2V and 2.5V), displaying an initial irreversible loss of less than 70 mAh/g of the anode material.

Example 4

A battery was prepared applying an electrolyte compositions of 60:30:10 by mole of ethylene carbonate, dimethyl carbonate and propylene carbonate and a salt mixture of 80:20 by mole of lithium tetrafluoroborate and hexafluorophosphate of a total salt concentration of 1M, The electrolyte was prepared by simple mixing. The battery was assembled by sandwiching, said electrolyte system between a negative electrode structure of graphite and a positive electrode structure of lithium manganese oxide. Both of these active electrode materials were mixed With 5% of carbon black for improved electronic conductivity.

Upon cycling of the battery it displayed a cyclability of more than 300 cycles, displaying an initial irreversible loss of less than 70 mAh/g of the anode material.

Example 5

A battery was prepared applying an electrolyte compositions of 80:20 by mole of ethylene carbonate and dimethyl carbonate and a salt mixture of 80:20 by mole of lithium tetrafluoroborate and hexafluorophosphate of a total salt concentration of 1M. The electrolyte was prepared by simple mixing. The electrolyte was incorporated in a microporous polyethylene-based separator. The battery was assembled upon sandwiching said electrolyte system between a negative electrode structure of graphite and a positive electrode structure of lithium manganese oxide.

Both of these active electrode materials were mixed with 5% of carbon black for improved electronic conductivity.

Upon cycling of the battery it displayed a cyclability of more than 250 cycles, displaying an initial irreversible loss of less than 50 mAh/g of the anode material.

What is claimed is:

1. An electrolyte system consisting essentially of:
   a solvent mixture, and
   a salt mixture,
   characterised in that the solvent mixture essentially consists of ethylene carbonate and dimethyl carbonate, that the salt mixture consists of lithium tetrafluoroborate and lithium hexafluorophosphate, and that the salt mixture comprises 60–90% by mole of lithium tetrafluoroborate and 10–40% by mole of lithium hexafluorophosphate.

2. An electrolyte system according to claim 1, in which the solvent mixture essentially consists of ethylene carbonate and dimethyl carbonate in a relative molar ratio of from 80:20 to 20:80.

3. An electrolyte system according to claim 1, in which the solvent mixture consists entirely of ethylene carbonate and dimethyl carbonate.

4. An electrolyte system according to claim 1, wherein the solvent mixture in addition to ethylene carbonate and dimethyl carbonate comprises one or more of the following solvents:
   (a) other alicyclic carbonates represented by the following general formula:

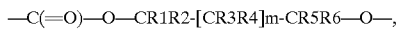

wherein each of R1, R2, R3, R4, R5 and R6 independently represent hydrogen or C1–C4 alkyl groups and m is an integer equal to 1 or 5;
   (b) aliphatic carbonates represented by the general formula R7[OC(O)]pOR8, wherein R7 and R8 independently represent C2–C4 alkyl groups, and p is an integer equal to 1 or 2, with the proviso that R8 represent C2–C4 alkyl groups, when R7 is methyl, and p=1;
   (c) lactones in the form of cyclic esters represented by the general formula:

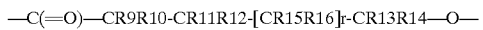

wherein each of R9, R10, R11, R12, R13, R14, R15 and R16 independently represent hydrogen or C1–2 alkyl groups and r is an integer equal to 0 or 1;
   (d) esters represented by the formula R17[C(O)]OR18[OR19]t, wherein each of R17, R18 and R19 independently represent hydrogen or C1–C2 alkyl groups, and t is an integer from 0 to 2;
   (e) glymes represented by the general formula R20O(R21O)nR22, in which R20 and R22 independently represent C1–2 alkyl groups. R21 is —(CR23R24CR25R26)- wherein R23, R24, R25 and R26 independently each represent hydrogen or C1–C4 alkyl groups, and n is an integer from 2 to 6.

5. A electrolyte system according to claim 1, in which the mixture of salts comprises lithium tetrafluoroborate and lithium hexafluorophosphate in a relative molar ratio of from 85:15 to 70:30.

6. An electrolyte system according to claim 1, in which lithium tetrafluoroborate and lithium hexafluorophosphate are present in a total concentration in the range from 0.0M to 3M.

7. An electrolyte system according to claim 1, in which the electrolyte system comprises a crosslinked or non-crosslinked polymer.

8. An electrolyte system according to claim 7, wherein said polymer is a non-crosslinked polymer.

9. An electrolyte system according to claim 7, wherein said polymer is one or more members selected from the group consisting of polymerized monofunctional oligomeric acrylates, polymerised difunctional oligomeric acrylates and polymerised trifunctional oligomeric acrylates; or from the group consisting of polymerised monofunctional monomeric acrylate polymerised difunctional monomeric acrylates and polymerised trifunctional monomeric acrylates.

10. An electrolyte system according to claim 7, wherein said polymers present in an amount corresponding to from 0% to 50% by weight, relative to the total weight of the electrolyte system.

11. An electrolyte system according to claim 1, in which the electrolyte system is confined in a separator consisting of a porous structure made from a polymer.

12. An electrolyte system according to claim 11 in which said separator is a woven or non-woven structure having a pore size in the range of 10×10 nm to 1×1 mm.

13. An electrolyte system according to the claim 11, in which said separator has a thickness of 10–100 μm.

14. A method for the preparation of an electrolyte system according to each of the preceding claims, comprising the steps of:

mixing the solvents, dissolving the salts in the solvent mixture at a molar ratio of 60%–90% $LiBF_4$ to 10%–40% $LiPF_6$, optionally adding a thickening agent to the solution, optionally incorporating the mixture obtained in a separator, and optionally adding monomers or oligomers having one or more polymerisable functional groups and inducing polymerisation of these monomers or oligomers.

15. A battery comprising a negative electrode, a positive electrode, and an electrolyte system, characterized in that the electrolyte system is an electrolyte system according to claim 1.

16. A battery according to claim 15, characterised in that the negative electrode consists essentially of graphites, cokes, oxides of tin, oxides of titanium, oxides of vanadium, oxides of cobalt or oxides of manganese.

17. A battery according to claim 16, characterised in that the negative electrode consists essentially of graphites and cokes of an interlayer distance $d_{002}$ of not more than 3.48 Å.

18. A battery according to claim 17, characterised in that the negative electrode consists essentially of one or more graphites.

19. A battery according to claim 17, characterized in that the negative electrode consists essentially of a coke of an interlayer distance $d_{002}$ in the range 3.42–3.44 Å.

20. A battery according to claim 15, characterised in that the positive electrode structure comprises an intercalation compound.

21. A battery according to claim 20, characterised in that the positive electrode structure consists essentially of spinel lithium manganese oxide.

22. A battery comprising the electrolyte system of claim 1.

* * * * *